(12) United States Patent
Lee

(10) Patent No.: US 8,587,690 B2
(45) Date of Patent: Nov. 19, 2013

(54) APPARATUS AND METHOD FOR PROCESSING IMAGE BY USING CHARACTERISTIC OF LIGHT SOURCE

(75) Inventor: Yong-Gu Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 246 days.

(21) Appl. No.: 13/106,456

(22) Filed: May 12, 2011

(65) Prior Publication Data

US 2011/0279703 A1 Nov. 17, 2011

(30) Foreign Application Priority Data

May 12, 2010 (KR) ........................ 10-2010-0044711

(51) Int. Cl.
*H04N 9/73* (2006.01)
*H04N 5/202* (2006.01)

(52) U.S. Cl.
USPC .................. 348/223.1; 348/226.1; 348/227.1; 348/225.1; 348/254; 382/167

(58) Field of Classification Search
USPC .......... 348/223.1, 225.1, 226.1, 227.1, 228.1, 348/229.1, 280, 254; 382/167
See application file for complete search history.

(56) References Cited

U.S. PATENT DOCUMENTS

| | | | | |
|---|---|---|---|---|
| 4,992,855 | A * | 2/1991 | Takei ........................ | 348/226.1 |
| 7,006,135 | B2 * | 2/2006 | Ishimaru et al. ........... | 348/223.1 |
| 7,102,669 | B2 * | 9/2006 | Skow ........................ | 348/223.1 |
| 7,479,991 | B2 * | 1/2009 | Wada ........................ | 348/223.1 |
| 8,248,483 | B2 * | 8/2012 | Ezawa et al. .............. | 348/222.1 |
| 2006/0197847 | A1 * | 9/2006 | Johnson et al. ............ | 348/229.1 |
| 2006/0221205 | A1 * | 10/2006 | Nakajima et al. .......... | 348/226.1 |

FOREIGN PATENT DOCUMENTS

JP    11285010  A  * 10/1999

\* cited by examiner

*Primary Examiner* — Nhan T Tran
(74) *Attorney, Agent, or Firm* — The Farrell Law Firm, P.C.

(57) ABSTRACT

An apparatus and method for processing an image of an image signal projected through a digital camera lens are provided. The apparatus includes an image sensor module for transforming an optical signal into an electric signal, to generate and output an image signal, and a light receiving module for detecting a light source. The apparatus also includes a light source characteristic detector for detecting a frequency of the light source, a white balance controller for controlling a white balance, a color corrector for removing interferences of red, green, and blue channels, and a gamma corrector for performing a gamma correction. The apparatus further includes an auto color adjustment controller for identifying a kind of light source based on the frequency of the light source, and controlling a white balance gain of the image signal based on the kind of the light source.

20 Claims, 14 Drawing Sheets

APPARATUS AND METHOD FOR PROCESSING IMAGE BY USING CHARACTERISTIC OF LIGHT SOURCE

PRIORITY

This application claims priority under 35 U.S.C. §119(a) to a Korean Patent Application entitled "Apparatus and Method for Processing Image by Using Characteristic of Light Source" filed in the Korean Intellectual Property Office on May 12, 2010 and assigned Serial No. 10-2010-0044711, the contents of which are incorporated herein by reference.

BACKGROUND OF THE INVENTION

1. Field of the Invention

The present invention relates generally to a method for processing an image, and more particularly, to an auto color control method for controlling colors of the image based on a kind of a light source.

2. Description of the Related Art

In general, color temperatures are different according to light source types. The human eye may recognize white colors as the same although adjacent illumination environments, or the light sources, are changed. For example, the human eye may recognize a white color seen under a blue light source or a white light source, such as a fluorescent light, and a white color seen under a red light source, such as an incandescent light, as the same color.

However, since an image sensor is implemented to exactly reproduce a reflected light of a given color temperature, the image sensor cannot actively apply and reflect the color temperature of the light source, and a detected white color is changed as the light source is changed. For example, a white object takes on a red color in the light source having a low color temperature, and the white object takes on a blue color in the light source having a high color temperature. In order to compensate for a color difference generated by the light sources having various color temperatures, most the image processing apparatuses (e.g., digital cameras, digital camcorders, etc.) that include the image sensor perform a digital image processing referred to as an Auto White Balance (AWB).

A method for processing the AWB is implemented by estimating a degree of the color difference by the light source from the image obtained through the image sensor, and determining a color gain for each color of the image sensor in order to compensate for the color difference. Known representative methods for processing the AWB include, a maximum Red-Green-Blue (RGB) scheme of estimating a white color based on a maximum value of an input image, a grayworld scheme of determining an average RGB value of an input color image as a gray color and estimating a reference white color by using the gray color, and a method of estimating the reference white color by using a neural network.

SUMMARY OF THE INVENTION

The present invention has been made to address at least the above problems and/or disadvantages and to provide at least the advantages described below. Accordingly, an aspect of the present invention provides an apparatus and a method for processing an image, which can estimate the kinds of light sources by using characteristics of the light sources and control color information to improve a color reproducibility.

The present invention also provides an apparatus and a method for processing an image, which can more accurately estimate the kinds of the light sources by using the characteristics of the light sources.

According to an aspect of the present invention, an apparatus is provided for processing an image of an image signal projected through a digital camera lens. The apparatus includes an image sensor module for transforming an optical signal projected through the digital camera lens into an electric signal, to generate and output an image signal. The apparatus also includes a light receiving module for detecting a light source. The light receiving module is disposed close to the image sensor module. Additionally, the apparatus includes a light source characteristic detector for detecting a frequency of the light source detected by the light receiving module, a white balance controller for controlling a white balance of the image signal output from the image sensor module, a color corrector for removing interferences of red, green, and blue channels of the image signal output from the white balance controller, and a gamma corrector for performing a gamma correction for the image signal output from the color corrector. The apparatus further includes an auto color adjustment controller for identifying a kind of light source based on the frequency of the light source from the light source characteristic detector, and controlling a white balance gain of the image signal from the gamma corrector based on the kind of the light source.

According to another aspect of the present invention, a method is provided for processing an image of an image signal projected through a digital camera lens. A frequency characteristic of a light source is identified to detect a kind of the light source. A first saturation value of an input image is detected. A predetermined first threshold is set according to the kind of the light source. The predetermined first threshold is compared with the first saturation value. An auto white balance is performed by estimating a white color included in the input image and setting a white balance gain value in order to correct the estimated white color, when the saturation value is less than the predetermined first threshold. The auto white balance is performed by applying a predetermined default gain according to the light source, when the saturation value is greater than or equal to the predetermined first threshold.

DETAILED DESCRIPTION OF EMBODIMENTS OF THE PRESENT INVENTION

Figure 1:
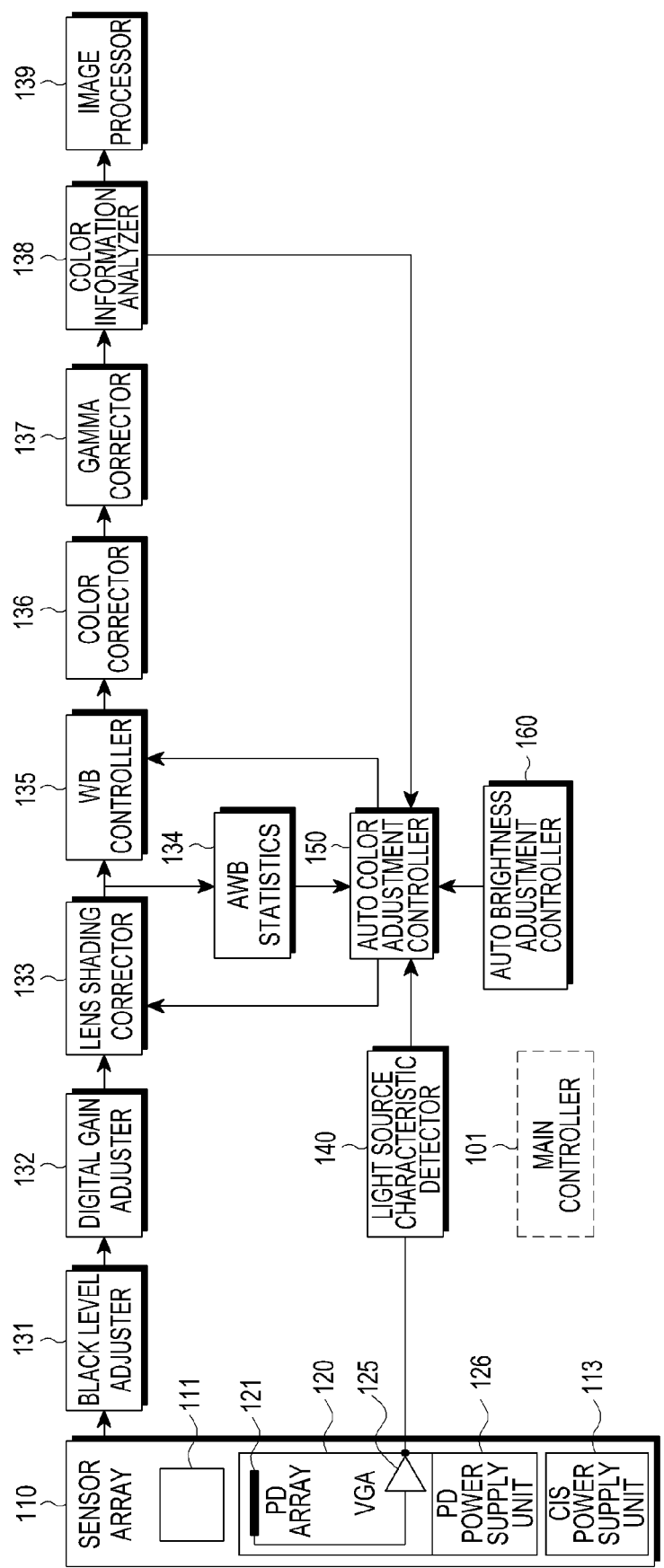
FIG. 1 is a block diagram illustrating a construction of an image processing apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the present invention.

FIG. 1 is a block diagram illustrating a construction of an image processing apparatus, according to an embodiment of the present invention. Referring to FIG. 1, the image processing apparatus, according to an embodiment of the present invention, includes a main controller 101, an image sensor module 110, a light receiving module 120, a black level adjuster 131, a digital gain adjuster 132, a lens shading corrector 133, an AWB statistics extracter 134, a white balance (WB) controller 135, a color corrector 136, a gamma corrector 137, a color information analyzer 138, an image processor 139, a light source characteristic detector 140, and an auto color adjustment controller 150.

The main controller 101 is connected to the image sensor module 110, the light receiving module 120, the black level adjuster 131, the digital gain adjuster 132, the lens shading corrector 133, the AWB statistics extracter 134, the WB controller 135, the color corrector 136, the gamma corrector 137, the color information analyzer 138, the image processor 139, the light source characteristic detector 140, and the auto color adjustment controller 150 included in the image processing apparatus, and controls the whole drive. Specifically, the main controller 101 provides a control signal for controlling an operating power of each functional unit, a timing signal of the image sensor arranged by the unit of a pixel, a sensor control signal, etc.

The image sensor module 110 transforms an optical signal projected through a camera lens into an electric signal, and generates an image signal for expressing a color of each pixel included in the image. In an embodiment of the present invention, the image signals indicate output values (R, G, and B) of the unit of the pixel of the image sensor module 110, and the image is an image formed by combining the image signals of the unit of the pixel. For example, the image may be a frame included in a picture or a dynamic image.

Further, the image sensor module 110 includes an image sensor array 111 including a plurality of image sensors suitably arranged for the resolution of the image, and a power supply unit 113 for supplying an operating power of the image sensor module 110. Moreover, the image sensor array 111 is controlled by the timing signal and the sensor control signal, and the image signal of the image sensor array 111 is output to the black level adjuster 131, according to the timing signal.

The black level adjuster 131 receives an input of an offset corresponding to a black level adjustment value to perform the black level adjustment for the image signal. The black level can be adjusted through a compensation by an exposure time or by a generalized equation after forcibly subtracting the offset from the image signals (R, G, and B). The black level for the signals of R, G, and B can also be adjusted by a predetermined adjustment table. The offset can be determined by a premeasured black level. The black level can be measured by the image signal output in a state where the light is shaded so that it is not incident through the lens.

The image signal, for which the black level has been adjusted, is input to the digital gain adjuster 132. The digital gain adjuster 132 controls the brightness such that the brightness of the image signal, for which the black level has been adjusted, remains constant by using an Auto Exposure (AE) algorithm.

The lens shading corrector 133 corrects a lens shading phenomenon, in which light amounts of a center area and an edge area of the image are different from each other. The lens shading corrector 133 receives an input of a lens shading setting value from the auto color adjustment controller 150 to correct colors of the center area and the edge area of the image. Further, the lens shading corrector 133 receives shading variables that are set differently according to the kinds of the light sources from the auto color adjustment controller 150, and processes the lens shading of the image to correspond to the received variables. Therefore, the lens shading corrector 133 can perform the lens shading processing by applying a different degree of the shading according to the kinds of the light sources. Further, the auto color adjustment controller 150 can refer to a control signal provided from an auto brightness adjustment controller 160, when the auto color adjustment controller 150 sets the shading variables.

The AWB statistics extracter 134 extracts a statistical value from the image required for an auto color adjustment algorithm and then provides the auto color adjustment controller 150 with the statistical value, to correspond to the WB of the image.

The WB controller 135 controls a gain level of the image signal such that a white object can be reproduced as an exact white color. The WB controller 135 performs a correction of the WB by multiplying the signals R, G, and B of the image signal by gain values (G gain (GG), R gain (GR), and B gain (GB)), respectively. The gain values (GR, GG, and GB) are determined by the auto color adjustment controller 150.

The color corrector 136 performs a color correction of an input image signal through an operation of a color correction matrix. Specifically, the color corrector 136 may perform the color correction by using Equation (1) below, in order to restore colors of a photographed image by removing an interference between R, G, and B channels from the input R, G, and B signals by the image sensor.

$$\begin{pmatrix} R' \\ G' \\ B' \end{pmatrix} = CCM \begin{pmatrix} R \\ G \\ B \end{pmatrix} \quad (1)$$

In Equation (1), R, G, and B are outputs for each channel of red, green, and blue of the image sensor, R', G', and B' are signals for each channel of red, green, and blue, in which the interference between the channels of R, G, and B is minimized, and CCM is a Color Correction Matrix. The CCM is a 3×3 matrix having a minimized interference between the R, G, and B channels.

In general, a gamma is a measure indicating a state of a contrast, and refers to an inclination of a characteristic curve, specifically, a change of concentration/a change of an exposure amount. Further, a display device such as a Cathode Ray Tube (CRT) has a non-linear relation between an electric beam current and an input voltage of the image signal, and a linear relation between the beam current and the brightness of the image. The brightness of the image for the input voltage of the image signal is non-linear. Therefore, the gamma corrector 137 performs a gamma correction for the standard image signal in consideration of the non-linear characteristic of the display device so that a final image signal has a linear characteristic. Specifically, the gamma corrector 137 corrects the non-linear characteristic of the display device.

The image processor 139 performs image processing for the image signal to form an image from the image signal. The formed image is displayed through a display or stored in a memory.

The light receiving module 120 included in the image apparatus, according to an embodiment of the present invention, is arranged close to the image sensor module 110, particularly close to the image sensor array 111, and detects an optical signal of an outside light source. The optical signal detected by the light receiving module 120 is output to the light source characteristic detector in order to be used for analysis of the light source characteristic. Specifically, the light receiving module 120 includes one or more light receiving elements 121, a Variable Gain Amplifier (VGA) 125 for controlling a gain of an output value of the light receiving element 121, and a power supply unit 126 for supplying an operating power of the light receiving module 120.

Figure 2A:
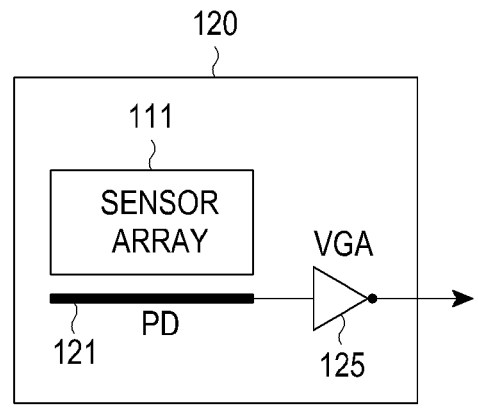
FIGS. 2A, 2B, and 2C are diagrams illustrating light receiving elements of light receiving modules included in the image processing apparatus, according to embodiments of the present invention.
Figure 2B:
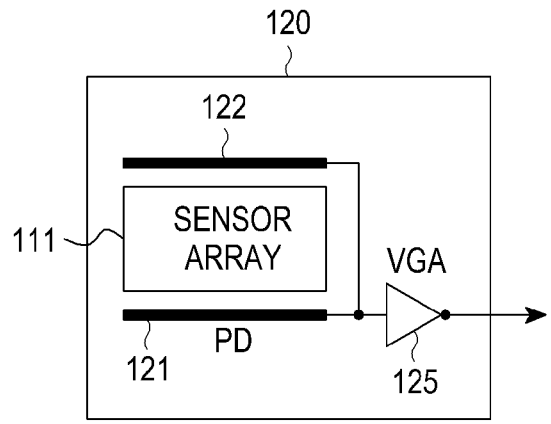
Figure 2C:
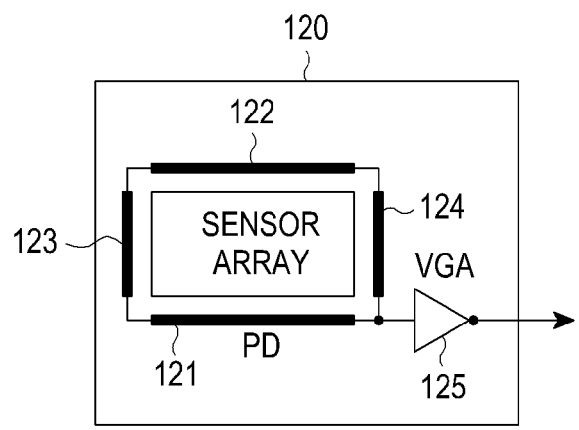

Referring to FIGS. 2A-2C, diagrams illustrate light receiving elements of light receiving modules included in the image processing apparatus, according to embodiments of the present invention. The light receiving module 120 may include the light receiving element 121 arranged at a lower part of the image sensor array 111 in a row direction as shown in FIG. 2A. Further, the light receiving module 120 may include two light receiving elements 121 and 122 arranged at an upper part and the lower part of the image sensor array 111 in a row direction as shown in FIG. 2B. Moreover, the light receiving module 120 may include a plurality of light receiving elements 121, 122, 123, and 124 arranged at upper, lower, left, and right parts of the image sensor array 111 to surround the image sensor array 111 as shown in FIG. 2C.

Figure 3:
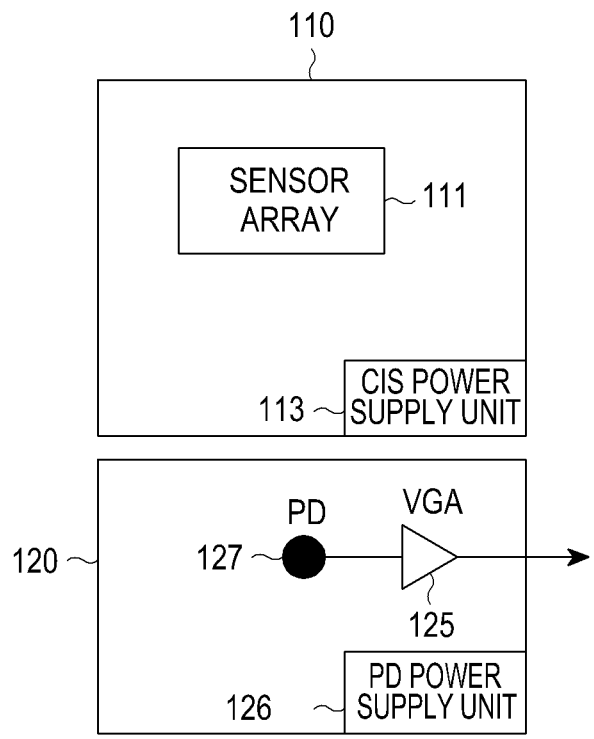
FIG. 3 is a diagram illustrating the light receiving module included in the image processing apparatus, according to an embodiment of the present invention.

Furthermore, the light receiving module 120 can be arranged inside the image sensor module 110 as shown in FIG. 1. Additionally, although the light receiving module 120 is arranged inside the image sensor module 110 in an embodiment of the present invention, the light receiving module 120 of the present invention is not limited thereto. If the light receiving module 120 is arranged close enough to the image sensor module 110 to exactly detect the light source characteristic affecting the image, the arrangement is satisfactory enough. For example, FIG. 3 is a diagram illustrating the light receiving module included in the image processing apparatus, according to an embodiment of the present invention. The light receiving module 120 can be arranged outside the image sensor module 110, as shown in FIG. 3. Further, when the light receiving module 120 is arranged outside the image sensor module 110, the light receiving element 121 can be replaced with one or more light receiving elements 127.

The image processing apparatus according to an embodiment of the present invention may further include an illumination intensity measuring instrument. The illumination intensity measuring instrument detects an adjacent illumination intensity of a location, in which the image is photographed by using the light detected through the light receiving elements 121 and 122 of the light receiving module 120. The illumination intensity measuring instrument can be arranged inside the main controller 101. Further, when the illumination intensity is measured by using the light detected by the light receiving elements 121 and 122, the image processing apparatus may further include a protection circuit using information of an exposure time for controlling an exposure in order to prevent a shadow image of the image sensor due to saturation of the light receiving element (e.g., a photo diode).

Moreover, when the illumination intensity is measured by using the light detected by the light receiving elements 121 and 122, the light receiving module 120 can measure the illumination intensity of a visible light area. Therefore, the light receiving module 120 may further include an optical filter capable of passing a wavelength of the visible light area through a front end part of the one or more light receiving elements 121, in order to detect the illumination intensity of the visible light area. The optical filter directly coats the light receiving element 121 or is implemented as a separate structure. Further, although the light receiving module 120 detects the illumination intensity of the visible light area in an embodiment of the present invention, the light receiving module 120 of the present invention is not limited thereto. For example, the light receiving module 120 can detect the illumination intensity of an infrared light area. Therefore, the light receiving module 120 may further include an optical filter capable of passing a wavelength of the infrared light area through a front end part of the one or more light receiving elements 121.

Figure 4:
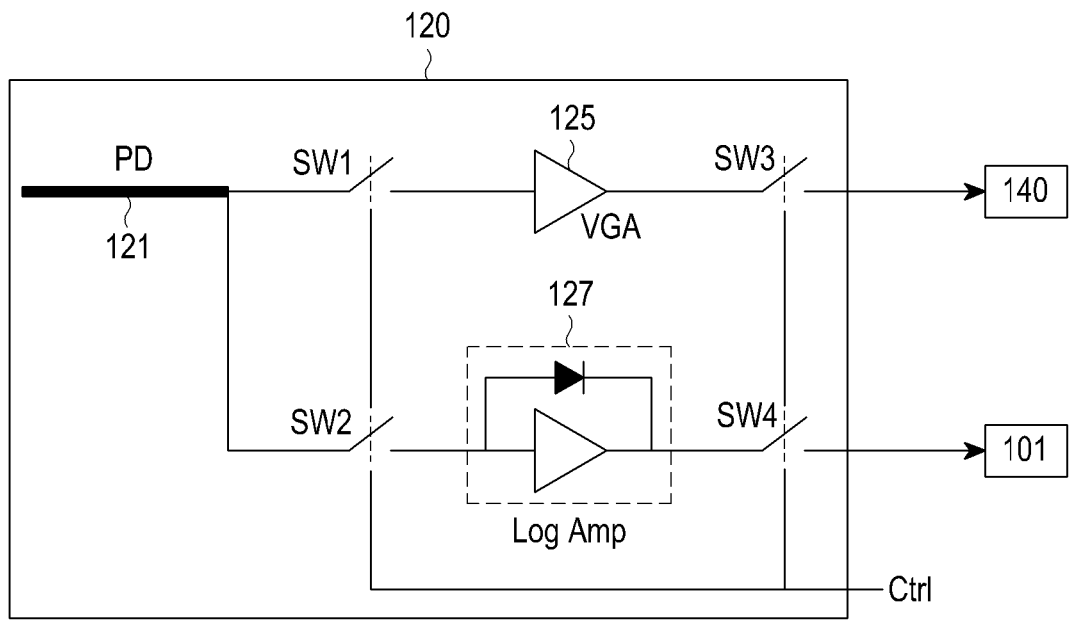
FIG. 4 is a diagram illustrating the light receiving module included in the image processing apparatus, according to an embodiment of the present invention.

FIG. 4 is a diagram illustrating the light receiving module included in the image processing apparatus, according to an embodiment of the present invention. Referring to FIG. 4, the light receiving module 120 includes the VGA 125 connected to the light receiving element 121 of the light receiving module 120, and a log amplifier 127 connected to the VGA 125 in parallel. The VGA 125 and the log amplifier 127 are selectively operated by a Control signal (Ctrl). Specifically, first and third switches (SW1 and SW3) are arranged at input and output ends of the VGA 125, respectively, and second and fourth switches (SW2 and SW4) are arranged at input and output ends of the log amplifier 127. The operations of the switches (SW1, SW2, SW3, and SW4) are controlled by the Ctrl defined in Table 1. The switches (SW1, SW2, SW3, and SW4) are used for the purpose of measuring a frequency characteristic of the light source or the purpose of measuring the illumination intensity.

TABLE 1

| Ctrl | SW1 | SW2 | SW3 | SW4 |
|------|-----|-----|-----|-----|
| 0 | 0 | 1 | 0 | 1 |
| 1 | 1 | 0 | 1 | 0 |

The lights generated by ignition, such as a light of the sun or a wood fire, and those generated by an artificial illumination have different frequency characteristics from each other. Through analysis of the frequency characteristics of the light sources, the light sourced can be distinguished.

Figure 5A:
FIGS. 5A to 5D are graphs illustrating frequency characteristics of light sources.
Figure 5B:
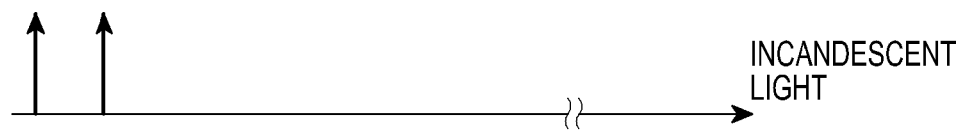
Figure 5C:
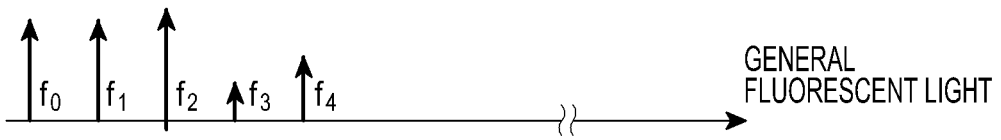
Figure 5D:
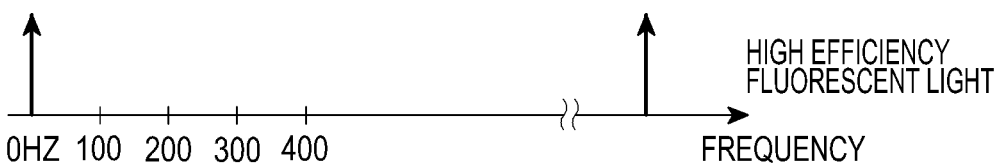

FIGS. 5A to 5D are graphs illustrating the frequency characteristics of the light sources. FIG. 5A illustrates the frequency characteristic of light of the sun, FIG. 5B illustrates the frequency characteristic of incandescent light, FIG. 5C illustrates the frequency characteristic of fluorescent light, and FIG. 5D illustrates the frequency characteristic of fluorescent light having a high efficiency (e.g., three wavelength fluorescent light). Referring to FIGS. 5A to 5D, the light using the light of the sun or a DC power source has a characteristic frequency of 0 Hz because the light using the light of the sun or the DC power source constantly emits all the time. The incandescent light has a characteristic frequency of 100 Hz (or 120 Hz) according to a frequency (50 Hz or 60 Hz) of utility power provided by a corresponding country or region. The fluorescent light shows various frequency characteristics according to used discharge gases. The discharged and output light has various frequency characteristics at frequencies from 2 times to 2N times of the frequency of utility power due to the discharge characteristic. The fluorescent light having a high efficiency, such as the three wavelength fluorescent light, has a characteristic of a frequency of several tens of KHz.

By using the characteristics, the light source characteristic detector 140 detects the frequency characteristic of the light source through a signal detected by the light receiving module 120, and then provides the auto color adjustment controller 150 with a result of the detected frequency characteristic.

Figure 6:
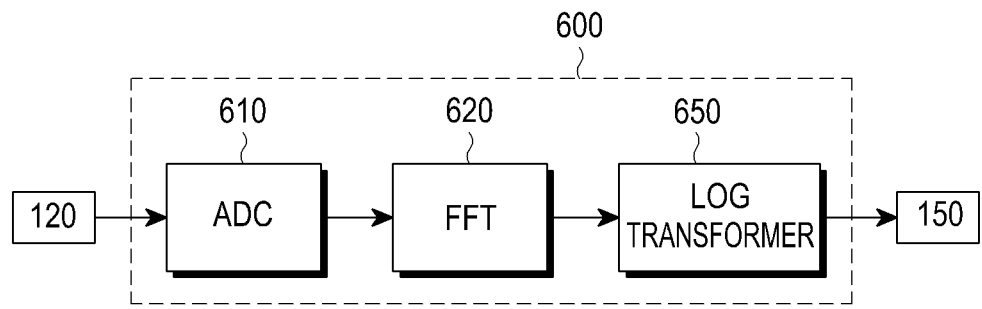
FIG. 6 is a diagram illustrating a light source characteristic detector included in the image processing apparatus, according to an embodiment of the present invention.

FIG. 6 is a diagram illustrating the light source characteristic detector included in the image processing apparatus, according to an embodiment of the present invention. Referring to FIG. 6, a source characteristic detector 600 includes an Analog to Digital Converter (ADC) 610 for sampling the signal detected through the light receiving module 120 by the unit of a predetermined cycle, and a Fast Fourier Transform (FFT) 620 for performing FFT of the ADC 610. Therefore, the auto color adjustment controller 150 determines whether the frequency detected by the light source characteristic detector 140 indicates a frequency of the light of the sun, the incandescent light, the fluorescent light, or the high efficiency fluorescent light. Further, in the case of the fluorescent light, frequencies f0 to fN are used for the analysis of the frequency, in order to minutely divide the light sources. An ADC resolution is determined according to the frequency characteristic of the frequency to be divided, and a sampling rate can be set as at least 2*fNyquist according to a Nyquist criterion.

In general, a Complementary Metal Oxide Semiconductor (CMOS) sensor, which is a solid image sensor, uses a line exposure. Therefore, the timings for charge accumulation of each pixel (e.g., photo diode) included in the image sensor array 111, which is a photographing side of the CMOS sensor, may be different between the lines according to the scanning timing of each pixel. Accordingly, when a subject is photographed using the CMOS sensor in an environment where the brightness of the subject is periodically changed, such as an indoor environment where the fluorescent light, instead of the light source using an inverter method, is used, the flicker by which horizontal stripes of light and shade are generated in the photographed image can be generated. In this case, the horizontal stripe is relevant to a size of the measured frequency f1. When the frequency f1 is not found, the horizontal stripe is not generated.

In order to prevent the flicker from being generated in the photographed image, a method exists for setting a charge accumulation time (shutter rate) of the CMOS sensor as an integer multiple of a blink cycle of the light source. In a photographing device in which the charge accumulation time is adjusted, although the timings for the charge accumulation are different according to each pixel, light intensity changes of the light sources within the charge accumulation time of each pixel are uniformized. Accordingly, the generation of the flicker can be suppressed.

Steps of detecting the generation of the flicker according to an embodiment of the present invention are not implemented according to a change period or a change frequency of a pixel value of a differential image of a vertical direction, which is implemented by various methods. The flicker is detected by using an output (e.g., f1) of the light source characteristic detector 140.

Specifically, the image processing apparatus, according to an embodiment of the present invention, uses the frequency f1 detected by the light source characteristic detector 140 as a flicker frequency to utilize the frequency f1 in controlling the charge accumulation time for suppressing the generation of the flicker. Therefore, the image processing apparatus, according to an embodiment of the present invention, may further include a flicker controller for controlling the flicker by setting the frequency f1 detected by the light source characteristic detector 140 as the charge accumulation time. For example, the flicker controller may be included in the main controller 101.

Further, since the output of the FFT 620 is a linear scale, it may not be easy to divide the frequencies f1 to fN. In order to solve the above problem, the light source characteristic detector 140 may further include a log transformer 650 for transforming the linear scale of the output of the FFT 620 into a log scale.

Figure 7:
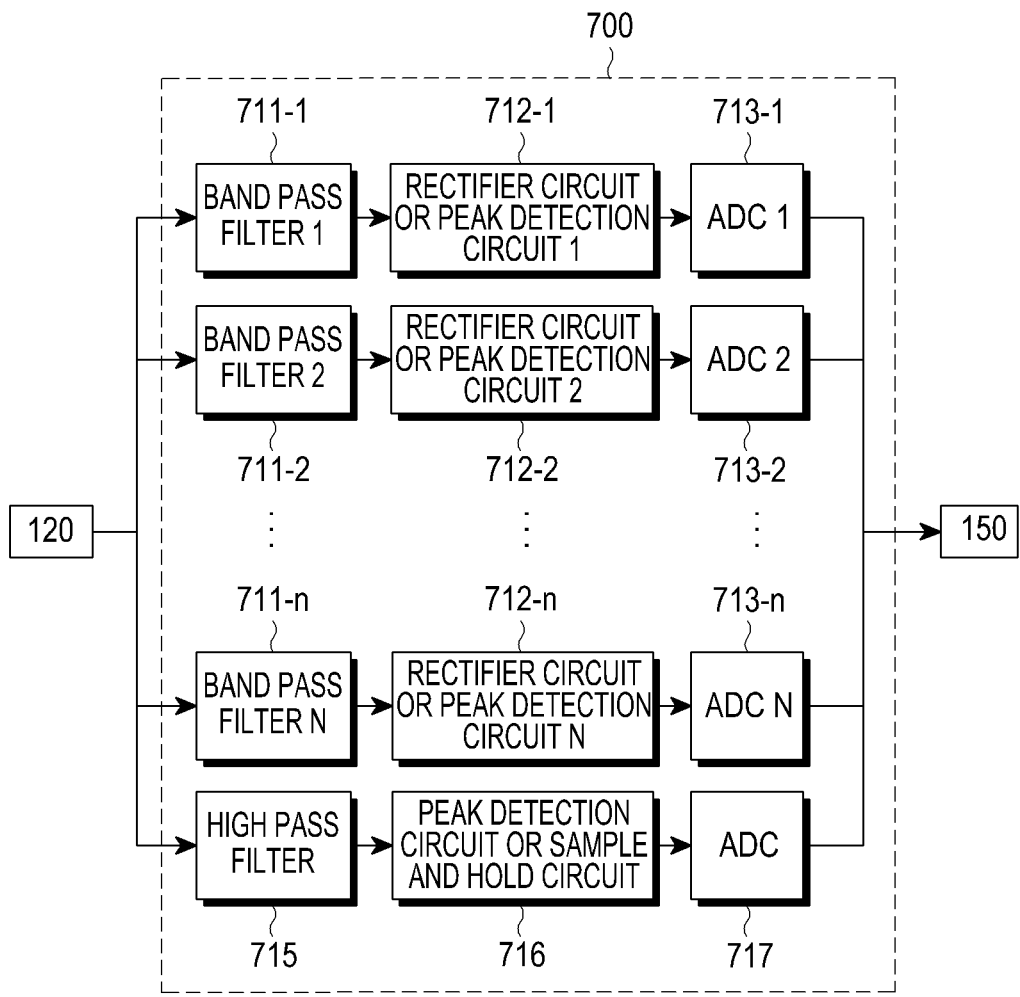
FIG. 7 is a diagram illustrating a light source characteristic detector included in the image processing apparatus, according to another embodiment of the present invention.

FIG. 7 is a diagram illustrating the light source characteristic detector included in the image processing apparatus, according to another embodiment of the present invention. Referring to FIG. 7, a light source characteristic detector 700 includes a plurality of band pass filters 711-1 to 711-n corresponding to frequencies of the light of the sun, the incandescent light, the fluorescent light, and the high efficiency fluorescent light, respectively. The light source characteristic detector 140 also includes a plurality of rectifier circuits 712-1 to 712-n connected to the band pass filters 711-1 to 711-n, respectively, and a plurality of ADCs 713-1 to 713-n connected to the rectifier circuits 712-1 to 712-n to sample output signals of the rectifier circuits 712-1 to 712-n by the unit of a predetermined cycle. Further, the light source characteristic detector 140 includes a high frequency pass filter 715, a peak detection circuit 716 for detecting a peak value of an output signal of the high frequency pass filter 715, and an ADC 717 for sampling an output signal of the peak detection circuit 716 by the unit of a predetermined cycle.

A construction in which the rectifier circuits 712-1 to 712-n are connected to the plurality of band pass filters 711-1 to 711-n is provided in FIG. 7, but a plurality of peak detection circuits can be provided as an alternative. Moreover, a construction, in which the peak detection circuit 716 is connected to the high frequency pass filter 715, is provided, but a sample and hold circuit can be provided as an alternative.

Figure 8:
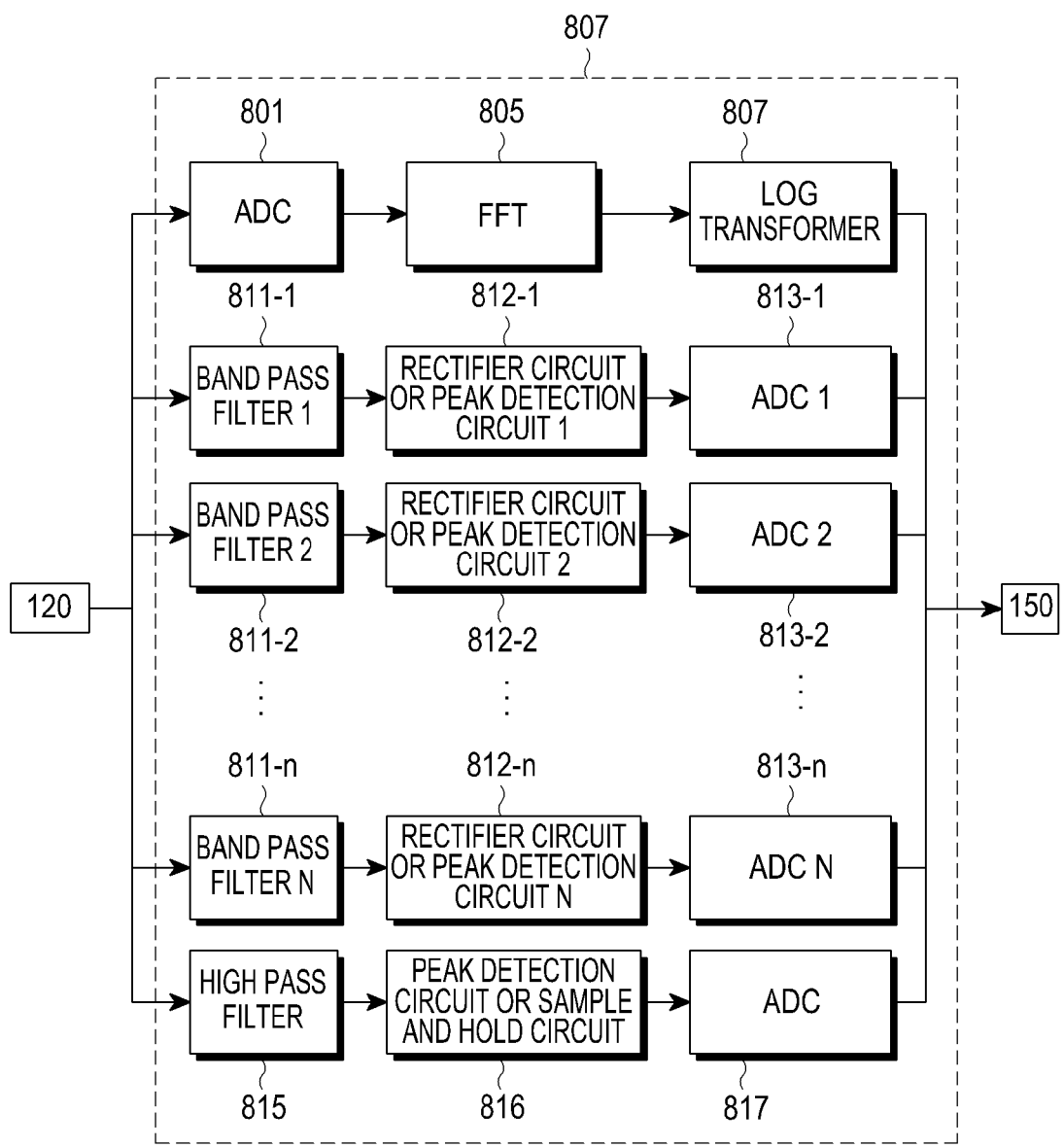
FIG. 8 is a diagram illustrating a light source characteristic detector included in the image processing apparatus, according to a further embodiment of the present invention.

FIG. 8 is a diagram illustrating the light source characteristic detector included in the image processing apparatus, according to another embodiment of the present invention. Referring to FIG. 8, a light source characteristic detector 807 includes a plurality of band pass filters 811-1 to 811-n, a plurality of rectifier circuits 812-1 to 812-n, a plurality of ADCs 813-1 to 813-n, a high frequency pass filter 815, a peak detection circuit 816, and an ADC 817, which are identical to those described in the light source characteristic detector in FIG. 7. Further, the light source characteristic detector 140 may include an ADC 801 for sampling a signal detected through the light receiving module 120 by the unit of a predetermined cycle, an FFT 805 for detecting a frequency by performing a FFT on an output signal of the ADC 801, which are identical to those in the light source characteristic detector shown in FIG. 6. The light source characteristic detector 140 may further include a log transformer 807 for transforming a scale of an output of the FFT 805 into a log scale.

The light source characteristic detector may include a plurality of peak detection circuits as an alternative for the plurality of rectifier circuits 812-1 to 812-n as in the light source characteristic detector of FIG. 7.

Figure 9:
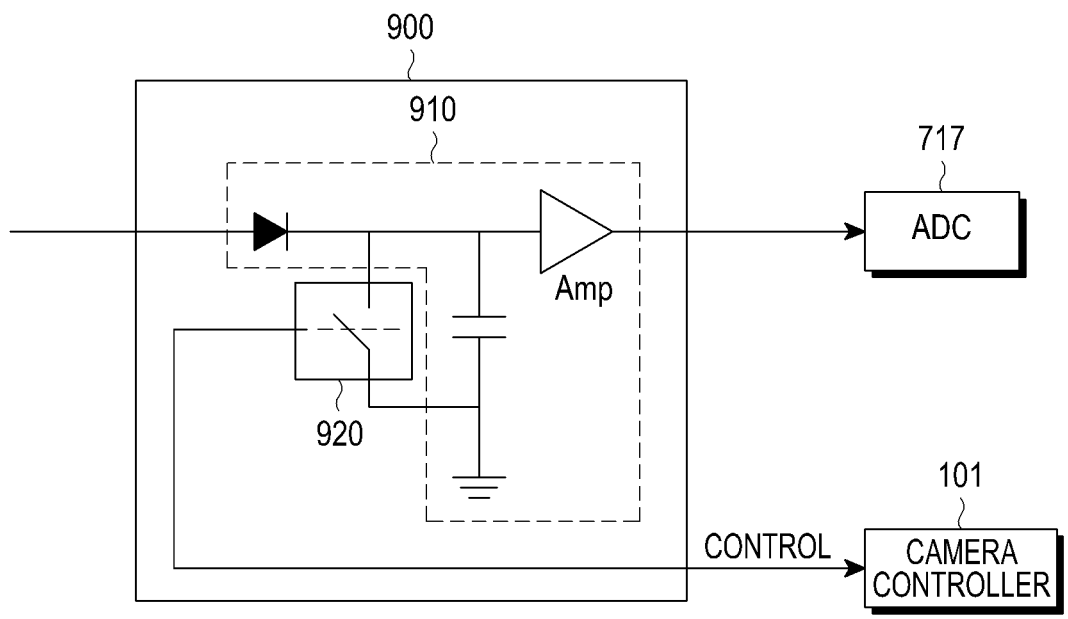
FIG. 9 is a circuit diagram illustrating a peak detection circuit of the light source characteristic detector included in the image processing apparatus, according to an embodiment of the present invention.

FIG. 9 is a circuit diagram illustrating the peak detection circuit of the light source characteristic detector included in the image processing apparatus, according to an embodiment of the present invention. Referring to FIG. 9, a peak detection circuit 900 includes a peak detector 910 for maintaining a peak value currently set before a peak value relatively larger than the peak value currently set is input. The peak detection circuit 716 also includes an auto reset switch 920 for resetting the maintained peak value by the unit of a predetermined cycle. The auto reset switch 920 receives an input of a reset control signal in every predetermined cycle from the main controller 101, and is operated to reset the peak value maintained by a capacitor of the peak detector 910. Further, after the reset operation of the auto reset switch 920, the light source characteristic detector can measure an accurate frequency characteristic by obtaining the signal with a regular delay in consideration of a central frequency and a pass band of the filter.

Figure 10:
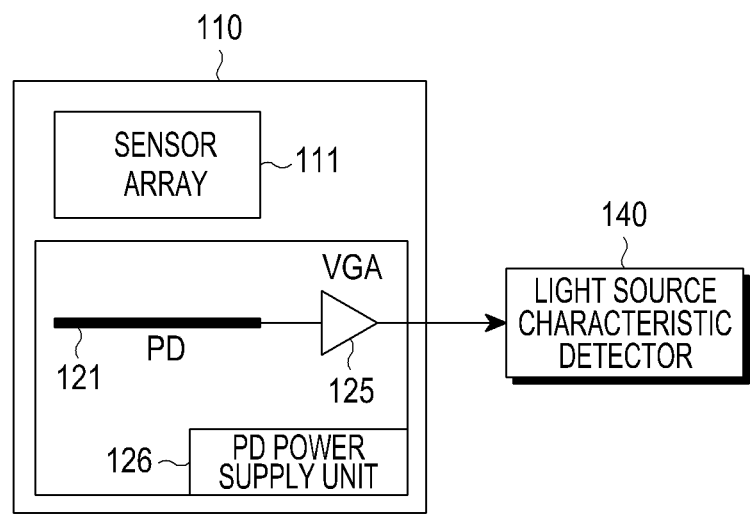
FIG. 10 is a diagram illustrating the light source characteristic detector included in the image processing apparatus, according to an embodiment of the present invention.
Figure 11:
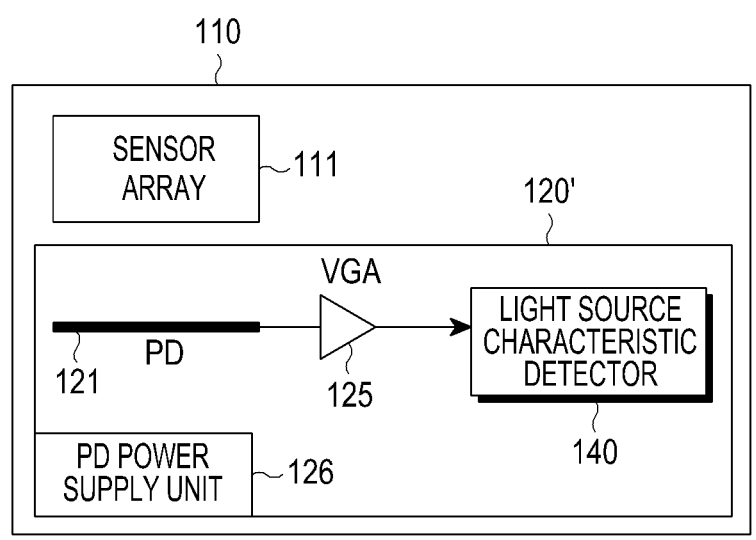
FIG. 11 is a diagram illustrating the light source characteristic detector included in the image processing apparatus, according to another embodiment of the present invention.

FIGS. 10 and 11 are diagrams illustrating the light source characteristic detector included in the image processing apparatus, according to embodiments of the present invention. The aforementioned light source characteristic detector 140 is arranged outside the image sensor module 110 as shown in FIG. 10 or inside the image sensor module 110 as shown in FIG. 11.

The auto color adjustment controller 150 can control colors of the image by using color statistics of the image. Therefore, the image processing apparatus, according to an embodiment of the present invention, may further include a color information analyzer 138 for analyzing the color statistics of the image.

Figure 12A:
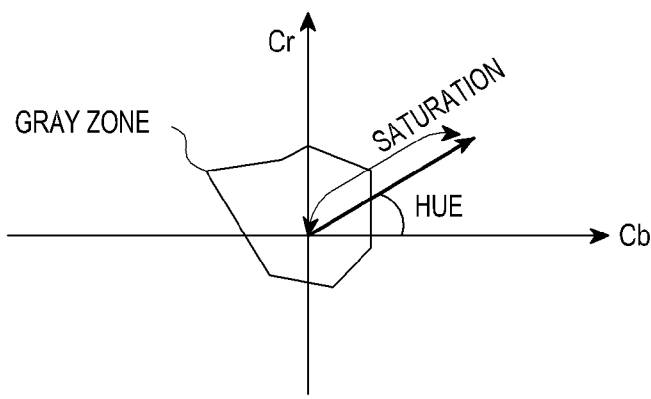
FIGS. 12A to 12D are graphs illustrating color statistics of the image, according to an embodiment of the present invention.
Figure 12B:
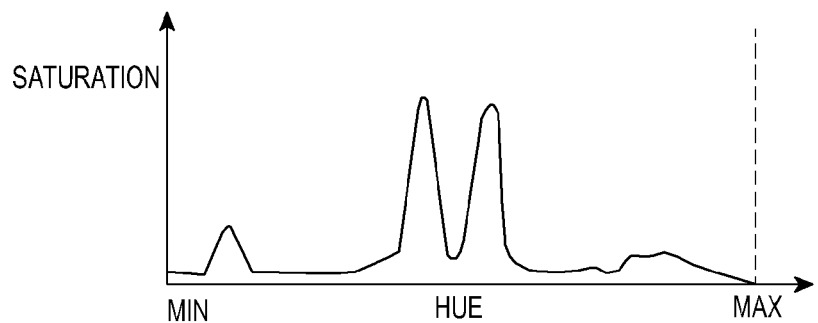
Figure 12C:
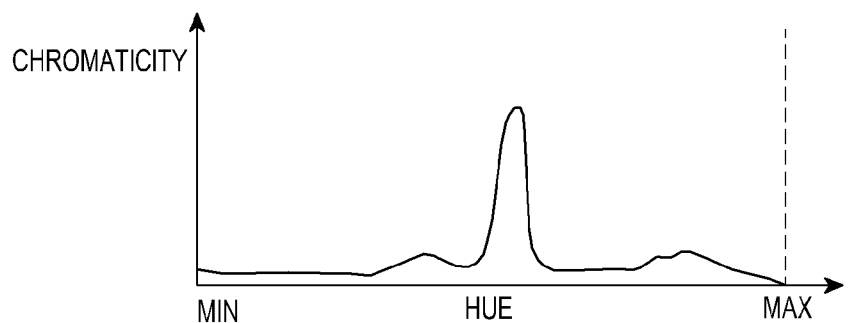
Figure 12D:
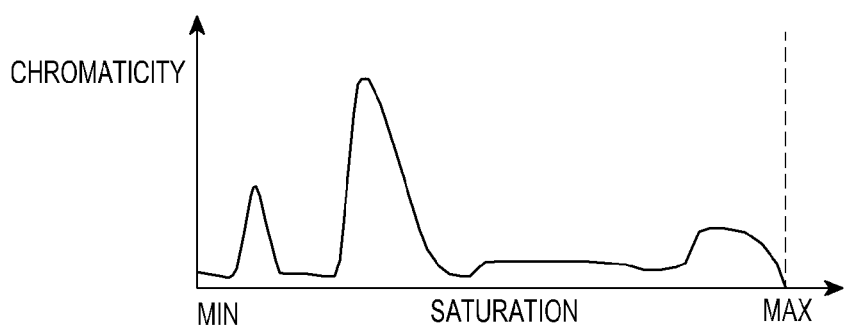

FIGS. 12A to 12D are graphs illustrating the color statistics of the image, according to an embodiment of the present invention. FIG. 12A indicates a gray zone of saturation and hue on a plane of Cb and Cr. FIG. 12B indicates a relation between the saturation and the hue. FIG. 12C indicates a relation between the hue and a chromaticity. FIG. 12D indicates a relation between the saturation and the chromaticity.

The color information analyzer 138 can analyze the color statistics of the image shown in FIG. 12 by using a color coordinate of Hue-Saturation-Value (HSV), Hue-Saturation-Intensity (HSI), or YCC (YUV, YCbCr, etc.) in a Bayer color, or by using a color coordinate of HSV, HSI, or YCC (YUV, YCbCr, etc.) in RGV color.

Figure 13:
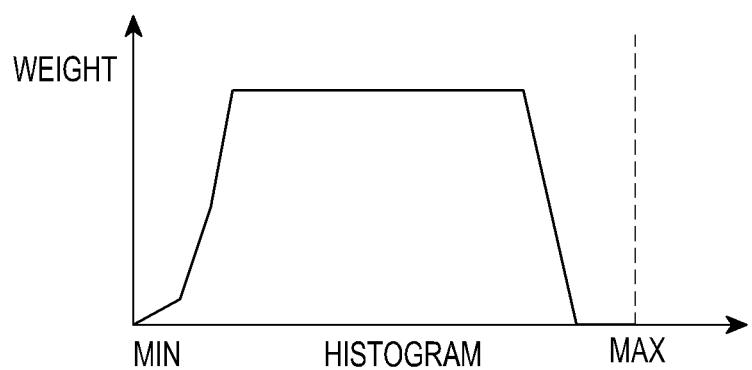
FIG. 13 is a graph illustrating a weighting according to the brightness, according to an embodiment of the present invention.

Further, the color information analyzer 138 sets a different weighting according to the brightness, from that of FIG. 13, in order to analyze the color statistics of the image, and then can analyze the color statistics of the image based on the setting of the weighting.

Meanwhile, the auto color adjustment controller 150 can control colors for pixels of the image included in the gray zone of Y min≤y≤Y max shown in FIG. 12A. Specifically, the pixels included in the gray zone are calculated by a gray pixel counter and pixels distributed outside the gray zone are used for the extraction of the relation between the hue and the saturation.

The auto color adjustment controller 150 performs an auto color adjustment by an image processing method, which is described in greater detail below.

Figure 14A:
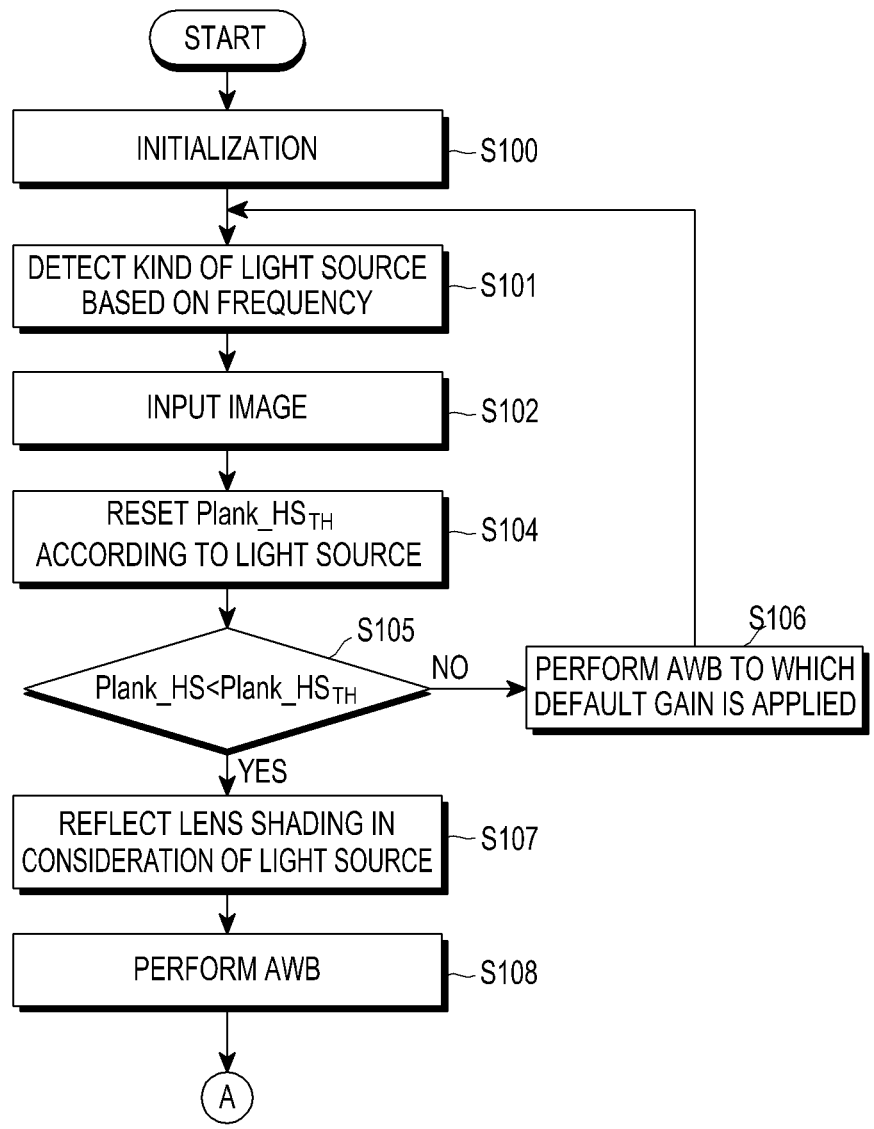
FIGS. 14A and 14B are flowcharts illustrating an image processing method, according to an embodiment of the present invention.
Figure 14B:
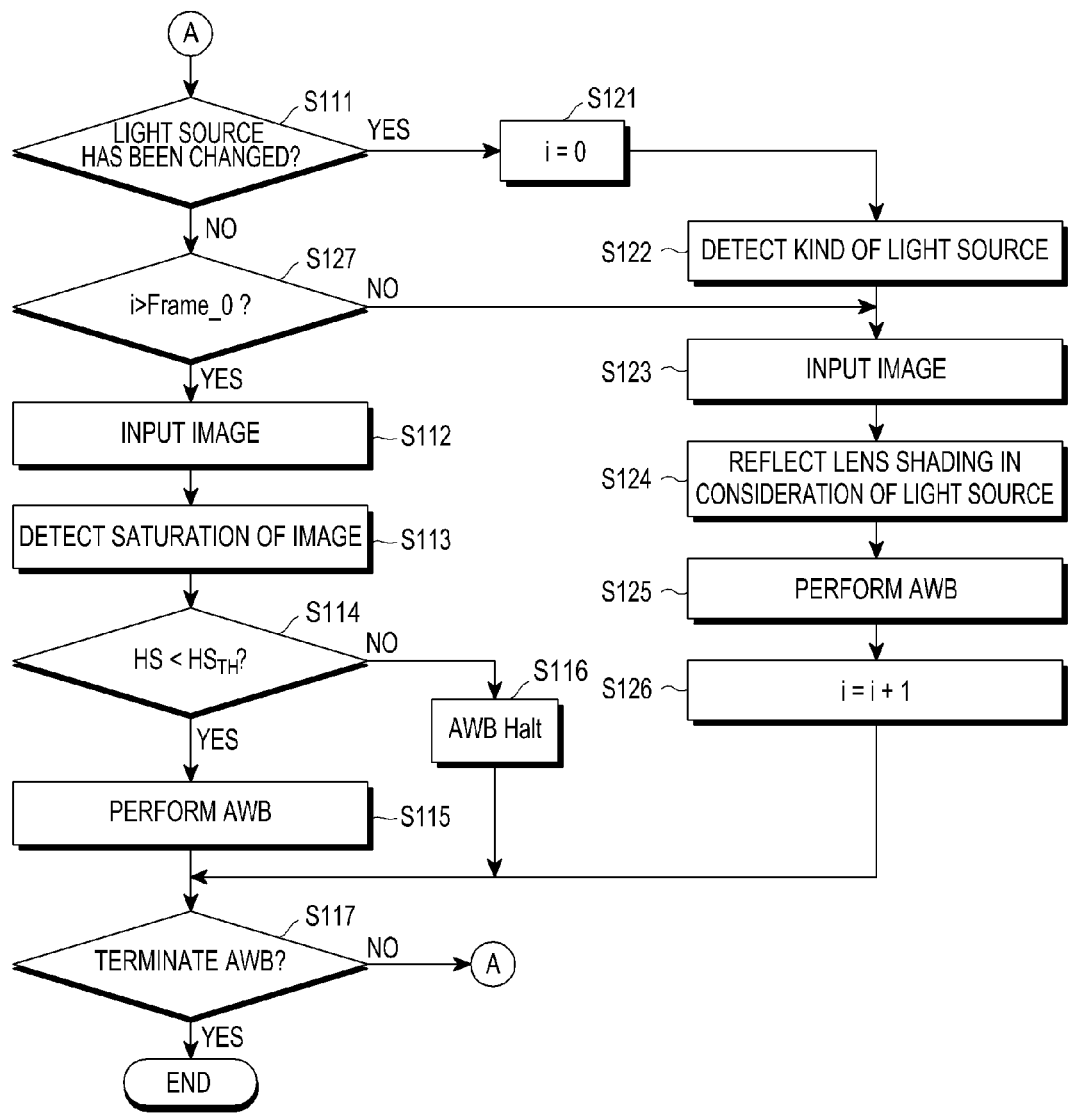

FIGS. 14A and 14B are flowcharts of the image processing method according to an embodiment of the present invention.

Step S100 sets parameters used for the image processing method. For example, the parameters include WB gain values ($G_R$, $G_G$, and $G_B$) for controlling the WB, a threshold (HSTH) of saturation values (HS) from a state of hue-saturation, the number of frames (Frame_0) required for the normal operation of the light source having a changed WB, a frequency characteristic of the light source (FFT_L), a threshold (Plank_HSTH) of a saturation value (Plank_HS) in the hue corresponding to a plankian locus color coordinate, degrees of the distribution (%) and the solid color of a gray pixel, boundary gain minimum values ($G_{R0}$, $G_{G0}$, $G_{B0}$), boundary gain maximum values ($G_{R1}$, $G_{G1}$, $G_{B1}$), and default gains ($G_{Rd}$, $G_{Gd}$, $G_{Bd}$) of the signals R, G, and B defined as a table according to the light source.

Step S101 detects a kind of light source by using a frequency characteristic. Specifically, step S101 identifies the frequency characteristic of an outside light source provided from the aforementioned light source characteristic detector 140, detects the kind of the light source in consideration of the frequency characteristic, and then sets the kind of the light source for the color adjustment of the image. For example, in consideration of the frequency characteristic of the light source in FIG. 5, the frequency characteristic detected through the current light receiving module 120, is compared with the frequency characteristic of the light source of FIG. 5. The light source having the frequency characteristic corresponding to a result of the comparison is detected.

Step S102 receives an input of the image, and step S103 identifies the saturation (Plank_HS) of the inputted image.

When the saturation of the inputted image is high, the WB may not normally operate due to the color included in the image. Therefore, when a color temperature is relatively high or low, it is preferable to separately perform the AWB. Accordingly, step S105 detects the saturation value (Plank_HS) in the hue corresponding to the plankian locus color coordinate, and then determines whether the saturation value (Plank_HS) in the hue corresponding to the plankian locus color coordinate is relatively smaller than a predetermined threshold (Plank_HSTH). When the saturation value (Plank_HS) in the hue corresponding to the plankian locus color coordinate is the same as or larger than the predetermined threshold (Plank_HSTH), it is identified that the color temperature is relatively high or low and step S106 is performed. When the saturation value (Plank_HS) in the hue corresponding to the plankian locus color coordinate is smaller than the predetermined threshold (Plank_HSTH), step S107 is performed. When the saturation of the inputted image is high, the AWB may not normally operate due to the color included in the image so that step S106 performs the AWB processing by applying the default gains (Rd, Gd, and Bd). In step S105, the saturation value (Plank_HS) in the hue corresponding to the plankian locus color coordinate can be provided by the color information analyzer 138 of the image processing apparatus, according to an embodiment of the present invention.

Further, since the saturation values (Plank_HS) in the hue corresponding to different plankian locus color coordinates according to the light source can be differently changed, it is preferable to first set the threshold (Plank_HSTH) of the saturation value (Plank_HS) according to the kind of the light source in step S104 before the performance of step S105.

Step S107 can apply different lens shadings in consideration of the degrees of distribution (%) and solid color of the gray pixel. When the degrees of distribution (%) and solid color of the gray pixel have values larger than a threshold defined in an initialization process, a degree of the lens shading compensation can be differently set. Further, when the degrees of distribution (%) and solid color of the gray pixel have values the same as or smaller than a threshold defined in an initialization process, the lens shading can be operated by a default value.

Step S108 estimates a white color included in the image, sets WB gain values ($G_R$, $G_G$, and $G_B$) in order to correct the estimated white color, and then provides the aforementioned WB controller 135 of the image processing apparatus with the WB gain values ($G_R$, $G_G$, and $G_B$) to perform the WB processing. At this time, the WB gain values ($G_R$, $G_G$, and $G_B$) are stored as certain variables ($G_{RA}$, $G_{GA}$, and $G_{BA}$). Further, step S108 reflects a color temperature corresponding to the kind of the light source identified in step S101 to the image.

In performing the AWB processing for the image currently inputted, it is possible to change the light source. For example, a camera or a camcorder equipped with the image processing apparatus can be moved by a user, or an illumination device such as the fluorescent lamp or the incandescent lamp can be turned on/off. Since the color temperature can be changed by the change of the light source, it is preferable to determine whether the light source has been changed before an input of a next image. Therefore, step S111 determines whether the light source has been changed by identifying a frequency of the light source provided by the light source characteristic detector 140 of FIG. 1. When the light source has been changed, step S121 is performed. When the light source has not been changed, step S112 is performed via step S127.

Step S111 can determine whether the light source has been changed based on the frequency of the light source. Specifically, when the frequency of the light source has been changed, it can be identified that the light source has been changed. It is also possible to determine whether the light source has been changed based on whether the light source is an indoor light source or an outdoor light source. For example, the light source is set as the outdoor light source when the light source is the light of the sun, and the light source is set as the indoor light source when the light source is the fluorescent light, the incandescent light, or the high efficiency fluorescent light. Subsequently, only when the frequency of the indoor light source (or outdoor light source) is changed into the frequency of the outdoor light source (or indoor light source), is it identified that the light source is changed. When the frequency of the light source is changed within the frequency of the indoor light source, it can be identified that the light source is not changed.

Step S112 receives an input of a next image.

When the saturation of the image is high, errors can be generated in performing the AWB so that step S113 detects the saturation of the image. Further, step S114 determines whether the saturation value (HS) from a state of hue-saturation is relatively smaller than a predetermined threshold (HSTH). When the saturation value (HS) from the state of hue-saturation is relatively smaller than the predetermined threshold (HSTH), step S115 is performed. When the saturation value (HS) from the state of hue-saturation is the same as or relatively larger than the predetermined threshold (HSTH), the errors can be generated in performing the AWB so that step S116 is performed. The saturation value (HS) from the state of hue-saturation can be provided from the aforementioned color information analyzer 138 of the image processing apparatus.

Step S115 estimates a white color included in the image, sets WB gain values ($G_R$, $G_G$, and $G_B$) in order to correct the estimated white color, and then provides the aforementioned WB controller 135 of the image processing apparatus with the WB gain values ($G_R$, $G_G$, and $G_B$) to perform the WB processing. At this time, the WB gain values ($G_R$, $G_G$, and $G_B$) are stored as certain variables ($G_{RA}$, $G_{GA}$, and $G_{BA}$).

On the other hand, step S116 processes an AWB halt. Specifically, step S116 provides the WB controller with the WB gain values (GRA, GGA, and GBA) set when the AWB of the previous image is performed in order to not reflect the WB of the current image, to perform the AWB processing.

When steps S122, S123, S124, and S125 for the AWB processing are performed according to the change of the light source, the changed color temperature may not be directly reflected in the AWB although the kind of the light source is changed and the light source is newly set. Therefore, it is preferable to perform the AWB a number of times equal to the number of predetermined input images in order to reflect the color temperature of the changed light source. Accordingly, step S121 initializes a value (i) for counting the number of images. Step S126 renews the value (i) for counting the number of images so that steps S123, S124, and S125 for the AWB processing, according to the change of the light source, are be repeatedly performed a number of times equal to the number of predetermined input images. Step S127 of determines whether steps S123, S124, and S125 for the AWB processing are performed a number of times equal to the number of predetermined input images.

Step S122 detects the kind of light source and sets the kind of light source for the color adjustment of the image. Step S123 receives an input of the image to perform the AWB.

Step S124 reflects the lens shading according to the kind of the light source, like that in step S107.

Step S125 estimates the white color included in the image, sets WB gain values ($G_R$, $G_G$, and $G_B$) in order to correct the estimated white color, and then provides the aforementioned WB controller 135 of the image processing apparatus with the WB gain values ($G_R$, $G_G$, and $G_B$) to perform the AWB processing. The white balance WB gain values ($G_R$, $G_G$, and $G_B$) are stored as certain variables ($G_{RA}$, $G_{GA}$, and $G_{BA}$).

Further, step S126 renews a count value (i) by adding 1 to the count value (i) in order to repeatedly perform steps S123, S124, and S125 for the AWB processing, according to the change of the light source, a number of times equal to the number of predetermined input images as described above. Step S127 is performed via steps S117 and S111.

When the count value i is smaller than or the same as the number (Frame_0) of predetermined input images in step S127, step S123 is performed in order to repeatedly perform steps S123, S124, and S125 for the auto white balance processing. When the count value i is larger than the number (Frame_0) of predetermined input images, steps S123, S124, and S125 for the auto white balance processing are not repeatedly performed and step S112 is performed.

Figure 15A:
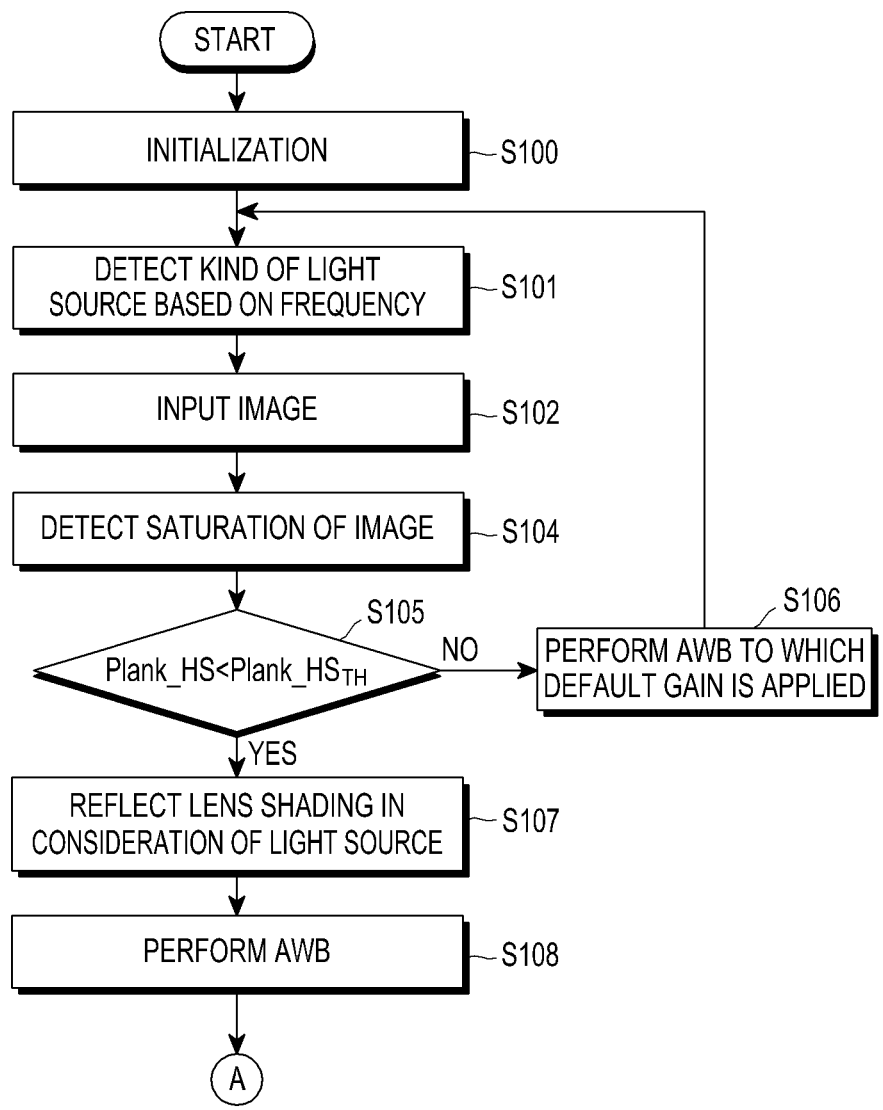
FIGS. 15A and 15B are flowcharts illustrating an image processing method, according to another embodiment of the present invention.
Figure 15B:
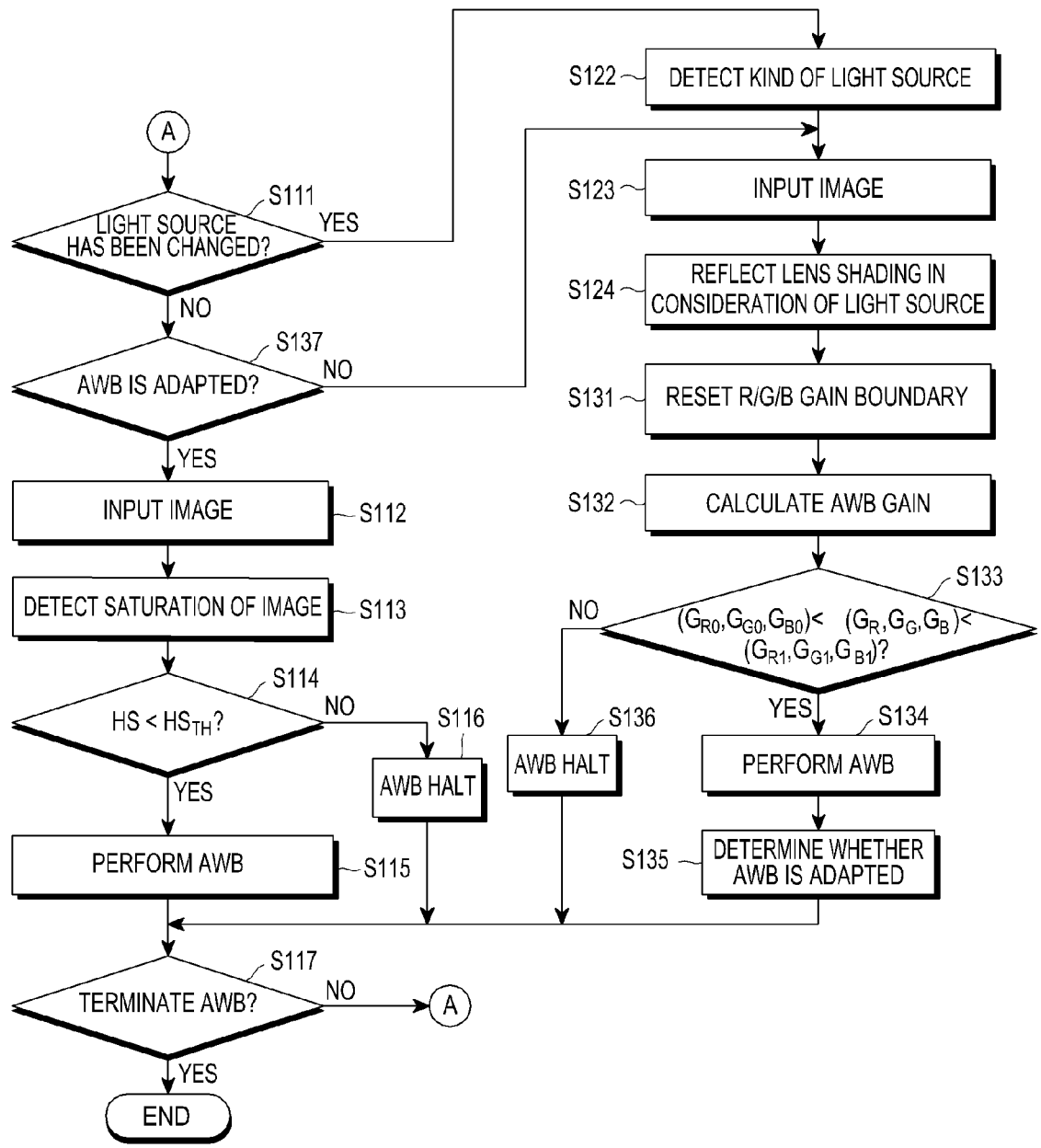

FIGS. 15A and 15B are flowcharts illustrating an image processing method, according to another embodiment of the present invention.

The image processing method of FIGS. 15A and 15B is identical to the image processing method of FIGS. 14A and 14B. However, steps S131, S132, S133, S134, S135, S136, and S137 of determining whether the AWB is adapted in FIGS. 15A and 15B are different from those of FIGS. 14A and 14B. In FIGS. 15A and 15B, steps identical to those of FIGS. 14A and 14B use reference numerals identical to those of FIGS. 14A and 14B, and their detailed description is provided above with reference to FIGS. 14A and 14B.

When it is identified that the light source has been changed through step S111, step S122 detects the kind of the light source and step S123 receives the input of the image. Further, step S124 reflects the lens shading in consideration of the kind of the light source detected in step S122.

Step S131 resets minimum values (GR0, GG0, and GB0) of a gain boundary of the AWB and maximum values (GR1, GG1, and GB1) of the gain boundary of the AWB, and step S132 calculates gain values (GR, GG, and GB) of the AWB by calculating the AWB. Step S133 determines whether each of the calculated gain values (GR, GG, and GB) of the AWB exists between the maximum and the minimum of the gain boundary. Specifically, it is determined whether the calculated gain values (GR, GG, and GB) of the AWB are GR0<GR<GR1, GG021 GG<GG1, and GB0<GB<GB1, respectively. Specifically, the gain values (GR, GG, and GB) of the AWB can be indicated as a polygon type, or implemented by dividing into cases in which the gains of R, G, and B are included in the polygon range and the gains of R, G, and B are not included in the polygon range.

Further, when each of the gain values (GR, GG, and GB) of the AWB exists between the maximum and the minimum of the gain boundary in step S133, step S134 is performed. When each of the gain values (GR, GG, and GB) of the AWB does not exist between the maximum and the minimum of the gain boundary in step S133, step S136 is performed.

Step S134 provides the aforementioned WB controller 135 of the image processing apparatus with the gain values (GR, GG, and GB) of the AWB to perform the AWB processing. The gain values (GB, GG, and GR) of the WB are stored as certain variables (GRA, GGA, and GBA).

Step S135 directly determines whether the AWB is adapted by using a degree of distribution of the gray pixel. When the AWB is adapted, the adaptation of the AWB is specified by allocating an AWB adaptation variable. With regard to the adaptation, step S137 determines whether the AWB is adapted by identifying the AWB adaptation variable. When the AWB is adapted, a procedure for the AWB processing is performed by receiving the input of the image through step S107. When the AWB is not adapted, it proceeds to step S123 to perform the AWB processing using the RGB gain boundaries.

Step S136 processes the AWB halt. Specifically, step S136 provides the WB controller with the WB gain values (GRA, GGA, and GBA) set when the AWB of the previous image is performed in order to not reflect the WB of the current image, to perform the AWB processing.

While the present invention has been shown and described with reference to certain embodiments thereof, it will be understood by those skilled in the art that various changes in form and detail may be made therein without departing from the spirit and scope of the invention as defined by the appended claims.

What is claimed is:

1. An apparatus for processing an image of an image signal projected through a digital camera lens, the apparatus comprising:
   an image sensor module for transforming an optical signal projected through the digital camera lens into an electric signal, to generate and output an image signal;
   a light receiving module for detecting a light source, wherein the light receiving module is disposed close to the image sensor module;
   a light source characteristic detector for detecting a frequency of the light source detected by the light receiving module;
   a white balance controller for controlling a white balance of the image signal output from the image sensor module;
   a color corrector for removing interferences of red, green, and blue channels of the image signal output from the white balance controller;
   a gamma corrector for performing a gamma correction for the image signal output from the color corrector; and
   an auto color adjustment controller for identifying a kind of light source based on the frequency of the light source from the light source characteristic detector, and controlling a white balance gain of the image signal from the gamma corrector based on the kind of the light source.

2. The apparatus as claimed in claim 1, wherein the light receiving module and the light source characteristic detector are disposed within the image sensor module.

3. The apparatus as claimed in claim 1, wherein the light receiving module comprises:
   a log amplifier connected in parallel to a variable gain amplifier; and
   one or more switches that are controlled such that one or more of a first path in which a signal moves from a light receiving element through the variable gain amplifier and a second path in which the signal moves from the light receiving element through the log amplifier, are connected to an output end.

4. The apparatus as claimed in claim 3, wherein the light receiving module further comprises an illumination intensity measuring instrument connected to the second path to measure an outside illumination intensity.

5. The apparatus as claimed in claim 3, wherein the light source characteristic detector comprises:
   a Fast Fourier Transform (FFT) processor for performing an FFT on a signal output from the light receiving module; and
   a log transformer for performing a log transform on a value output from the FFT processor.

6. The apparatus as claimed in claim 3, wherein the light source characteristic detector comprises:
   two or more band pass filters for receiving a signal output from the light receiving module and passing a frequency of a predetermined band corresponding to the frequency of the light source;
   two or more rectifier circuits for rectifying an output of the band pass filter, wherein each of the two or more rectifier circuits are connected to a respective one of the two or more band pass filters;
   a high frequency filter for receiving the signal output from the light receiving module and passing a signal of a predetermined high frequency band;
   a peak detection circuit for detecting a peak value of a signal output from the high frequency filter; and three or more analog-digital transformers for transforming analog signals output from the two or more rectifier circuits and the peak detection circuit into digital signals.

7. The apparatus as claimed in claim 6, wherein the light source characteristic detector further comprises:
   an FFT processor for performing an FFT on the signal output from the light receiving module; and
   a log transformer for performing a log transform on a value output from the FFT processor.

8. The apparatus as claimed in claim 6, wherein the peak detection circuit comprises:
   a peak detector for detecting a peak value of the signal output from the high frequency filter; and
   an auto reset switch for resetting the peak detector in each predetermined cycle.

9. The apparatus as claimed in claim 3, wherein the light source characteristic detector comprises:
   two or more band pass filters for receiving a signal output from the light receiving module and passing a frequency of a predetermined band corresponding to the frequency of the light source;
   two or more peak detection circuits for detecting a peak value of an output value of the two or more band pass filters, wherein each of the two or more peak detection circuits is connected to a respective one of the two or more band pass filters;
   a high frequency filter for receiving a signal output from the light receiving module and passing a signal of a predetermined high frequency band;
   a sample and hold circuit for maintaining an output value from the high frequency filter by a unit of a predetermined cycle; and
   three or more analog-digital transformers for transforming analog signals output from the two or more peak detection circuits and the sample and hold circuit into digital signals.

10. The apparatus as claimed in claim 9, wherein the light source characteristic detector further comprises:
    an FFT processor for performing an FFT on the signal output from the light receiving module; and
    a log transformer for performing a log transform of a value output from the FFT processor.

11. The apparatus as claimed in claim 9, wherein each of the two or more peak detection circuits comprises:
    a peak detector for detecting a peak value of the output value of the band pass filter; and
    an auto reset switch for resetting the peak detector in each predetermined cycle.

12. The apparatus as claimed in claim 1, further comprising a lens shading corrector for receiving an input of a correction value of a lens shading from the auto color adjustment controller and processing the lens shading.

13. The apparatus as claimed in claim 1, further comprising:
    a color information analyzer for analyzing color information including a relationship between hue and saturation, a relationship between hue and chromaticity, a relationship between saturation and chromaticity, and a distribution chart of gray pixels;
    wherein the auto color adjustment controller determines whether the white balance is adapted by using the color information.

14. The apparatus as claimed in claim 1, further comprising:
    a flicker controller for receiving an input of the frequency of the light source output through the light source characteristic detector, and controlling such that a charge accumulation time of the image sensor corresponds to the frequency of the light source or a multiple of the frequency of the light source.

15. A method for processing an image of an image signal projected through a digital camera lens, the method comprising the steps of:
    identifying a frequency characteristic of a light source to detect a kind of the light source;
    detecting a first saturation value of an input image;
    setting a predetermined first threshold according to the kind of the light source;
    comparing the predetermined first threshold with the first saturation value;
    performing an auto white balance by estimating a white color included in the input image and setting a white balance gain value in order to correct the estimated white color, when the saturation value is less than the predetermined first threshold; and
    performing the auto white balance by applying a predetermined default gain according to the light source, when the saturation value is greater than or equal to the predetermined first threshold.

16. The method as claimed in claim 15, further comprising:
    determining whether the light source has been changed;
    detecting a kind of the changed light source in response to the change of the light source; and
    receiving the input image and performing the auto white balance by estimating the white color included in the input image.

17. The method as claimed in claim 16, further comprising:
    initializing a count value to a number of images before receiving the input image;
    renewing the count value after performing the auto white balance;
    determining whether the renewed count value is larger than a predetermined second threshold; and
    receiving the input image and performing the auto white balance by estimating the white color included in the input image, when the renewed count value is less than or equal to the predetermined second threshold.

18. The method as claimed in claim 15, further comprising:
    determining whether the light source has been changed;
    detecting a kind of the changed light source in response to the change of the light source;
    receiving the input image;
    setting a maximum value and a minimum value of a gain boundary in order to process the auto white balance;
    estimating the white color included in the input image and identifying a gain value of the auto white balance in order to correct the estimated white color;
    determining whether the gain value of the white balance exists within a range of the gain boundary for processing the auto white balance;
    performing the auto white balance by estimating the white color included in the image when the gain value of the white balance exists within the range of the gain boundary for processing the auto white balance; and
    performing an auto white balance halt of performing the auto white balance by using a predetermined variable when the gain value of the white balance does not exist within the range of the gain boundary for processing the auto white balance.

19. The method as claimed in claim 15, wherein performing of the auto white balance comprises:
- estimating the white color included in the image;
- setting the gain value of the white balance in order to correct the estimated white color; and
- storing the gain value of the white balance as a predetermined variable.

20. The method as claimed in claim 15, further comprising reflecting a lens shading in consideration of the kind of the light source before the auto white balance is performed.

* * * * *